United States Patent [19]

Pastor et al.

[11] Patent Number: 5,446,658
[45] Date of Patent: Aug. 29, 1995

[54] METHOD AND APPARATUS FOR ESTIMATING INCLINE AND BANK ANGLES OF A ROAD SURFACE

[75] Inventors: Stephen R. Pastor, Sterling Heights; Gordon L. Tierney, Washington, both of Mich.

[73] Assignee: General Motors Corporation, Detroit, Mich.

[21] Appl. No.: 263,694

[22] Filed: Jun. 22, 1994

[51] Int. Cl.6 .......................... G01C 9/10; B60T 8/58
[52] U.S. Cl. .................... 364/424.01; 364/426.02; 364/559; 73/104
[58] Field of Search ................ 364/426.02, 426.01, 364/424.01, 426.03, 551.01, 559, 560; 180/197; 73/104, 105; 33/328, 343, 365

[56] References Cited

U.S. PATENT DOCUMENTS

| | | | |
|---|---|---|---|
| 3,977,694 | 8/1976 | Nordstrom | 280/112.2 |
| 4,788,773 | 12/1988 | Plasgard et al. | 33/333 |
| 5,043,896 | 8/1991 | Sol | 364/426.02 |
| 5,058,017 | 10/1991 | Adachi et al. | 364/424.05 |
| 5,132,906 | 7/1992 | Sol et al. | 364/426.02 |
| 5,243,564 | 9/1993 | Ikeda et al. | 342/107 |
| 5,258,912 | 11/1993 | Ghoneim et al. | 364/424.05 |
| 5,347,457 | 9/1994 | Tanaka et al. | 364/424.05 |

Primary Examiner—Kevin J. Teska
Assistant Examiner—Tan Q. Nguyen
Attorney, Agent, or Firm—Timothy G. Gorbatoff

[57] ABSTRACT

The present invention is directed to a method and apparatus for estimating incline and bank angles of a road surface upon which a front wheel drive vehicle is travelling. Each nondriven rear wheel is equipped with a rotational speed sensor. The vehicle is further equipped with longitudinal and lateral accelerometers mounted to the vehicle chassis above the centerline of the rear axle. Outputs from the speed sensors and accelerometers are fed into a vehicle on-board controller and utilized in computing the incline and bank angles of the road surface. Updated incline and bank angles are maintained in the controller's memory for access by various control systems to alter vehicle attributes for improved handling and operation.

16 Claims, 5 Drawing Sheets

METHOD AND APPARATUS FOR ESTIMATING INCLINE AND BANK ANGLES OF A ROAD SURFACE

The present invention relates to a method and apparatus for estimating the slope of a road surface, and more particularly, to a method and apparatus for estimating incline and bank angles of a road surface upon which a vehicle is travelling.

BACKGROUND OF THE INVENTION

Sophisticated vehicular control systems may desire to alter various operational attributes such as suspension, transmission shifting and anti-lock braking characteristics in the presence of varying driving conditions. Incline and bank angles of a road surface upon which the vehicle is travelling represent two such conditions.

SUMMARY OF THE INVENTION

The present invention is directed to a method and apparatus for estimating incline and bank angles of a road surface upon which a front wheel drive vehicle is travelling. In accordance with the present invention, each nondriven rear wheel is equipped with a rotational speed sensor. The vehicle is further equipped with longitudinal and lateral accelerometers mounted to the vehicle chassis above the centerline of the rear axle. Outputs from the speed sensors and accelerometers are fed into a vehicle on-board controller and utilized by the controller in computing the incline and bank angles of the road surface.

According to one aspect of the present invention, estimation of the incline angle $\theta_I$ of a road surface is computed in accordance with the following equation:

$$\theta_I = \text{SIN}^{-1}[\text{SENSED LONGITUDINAL ACCELERATION} - \text{COMPUTED LONGITUDINAL ACCELERATION} - \text{BIAS}_{LONG}] - \theta_P$$

where SENSED LONGITUDINAL ACCELERATION is the longitudinal acceleration sensed by the longitudinal accelerometer; COMPUTED LONGITUDINAL ACCELERATION is a longitudinal acceleration computed by the controller in accordance with the change in the average nondriven rear wheel speeds divided by the scan rate of the controller; $\text{BIAS}_{LONG}$ is a constant associated with the longitudinal accelerometer installation; and $\theta_P$ is the vehicle pitch angle defined as the degree of longitudinal tilt of the vehicle resulting from the presence of the SENSED LONGITUDINAL ACCELERATION.

According to another aspect of the present invention, estimation of the bank angle $\theta_B$ of a road surface is computed in accordance with the following equation:

$$\theta_B = \text{SIN}^{-1}[\text{SENSED LATERAL ACCELERATION} - (\text{YAW RATE} \times \text{COMPUTED LONGITUDINAL VELOCITY}) - \text{BIAS}_{LAT}] - \theta_R$$

where SENSED LATERAL ACCELERATION is the lateral acceleration sensed by the lateral accelerometer; YAW RATE is the turning rate of the vehicle; COMPUTED LONGITUDINAL VELOCITY is the vehicle longitudinal velocity computed in accordance with the average nondriven rear wheel speeds; $\text{BIAS}_{LAT}$ is a constant associated with the lateral accelerometer installation; and $\theta_R$ is the vehicle roll angle defined as the degree of lateral tilt of the vehicle resulting from the presence of the SENSED LATERAL ACCELERATION.

Updated incline and bank angles are maintained in the controller's memory for access by various control systems to alter vehicle attributes for improved handling and operation.

DETAILED DESCRIPTION OF THE PREFERRED EMBODIMENT

Figure 1:
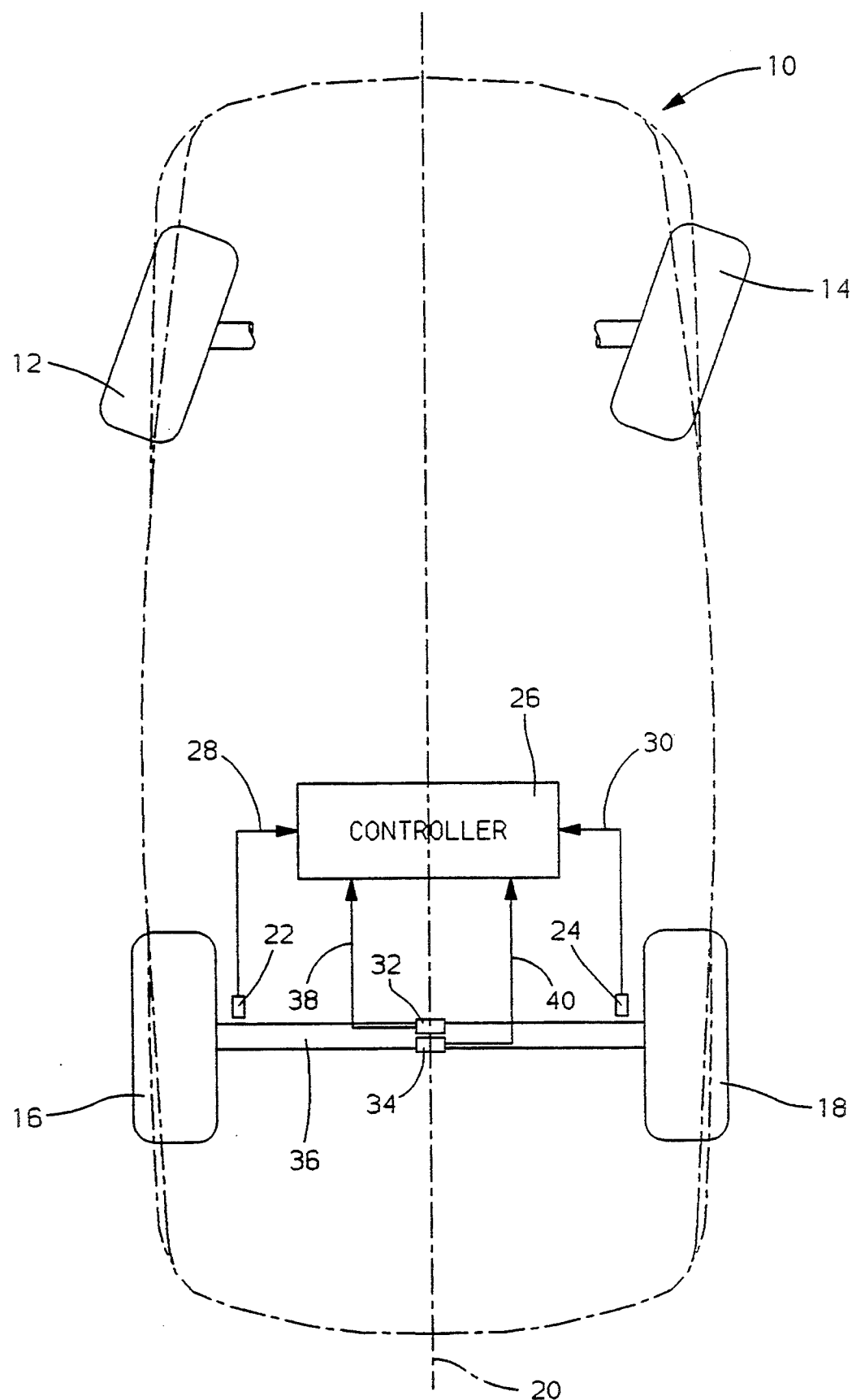
FIG. 1 is a schematic illustration of a vehicle equipped with the apparatus of the present invention.

FIG. 1 is a schematic illustration of a vehicle equipped with the apparatus of the present invention. Referring to FIG. 1, vehicle 10 includes front-driven steering wheels 12 and 14, nondriven nonsteering rear wheels 16 and 18, controller 26, speed sensors 22 and 24, and lateral and longitudinal accelerometers 32 and 34, respectively.

Speed sensors 22 and 24 are responsive to the rotational speed of rear wheels 16 and 18, respectively. Outputs of the speed sensors 22 and 24 are fed into controller 26 via signal lines 28 and 30, respectively.

Lateral accelerometer 32 is mounted to the vehicle chassis 10 above the centerline of the rear axle 36 and is responsive to vehicular acceleration normal to the longitudinal centerline 20 of the vehicle. The output of the lateral accelerometer 32 is fed into controller 26 via signal line 38.

Longitudinal accelerometer 34 is mounted to the vehicle chassis 10 above the centerline of the rear axle 36 and is responsive to vehicular acceleration parallel to the longitudinal centerline 20 of the vehicle. The output of the longitudinal accelerometer 34 is fed into controller 26 via signal line 40.

The controller 26 utilizes inputs received from the speed sensors 22 and 24 and accelerometers 32 and 34 to compute the incline and bank angles of the road surface in accordance with computer routines contained within the controller 26.

Updated incline and bank angles are maintained in memory within the controller 26 for access by various vehicle control systems to alter vehicle attributes for improved handling and operation.

Figure 2:
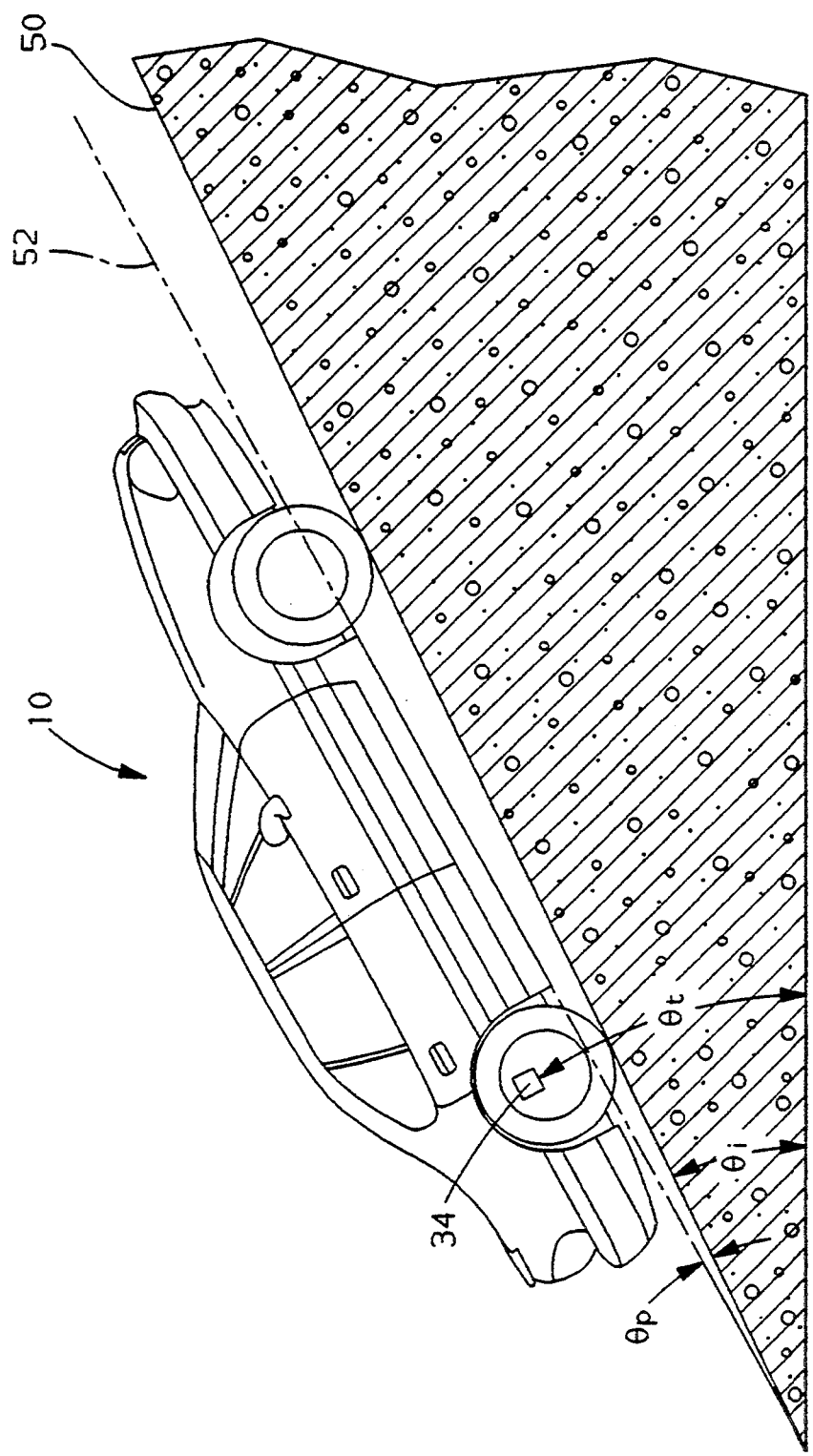
FIG. 2 is a schematic illustration of a vehicle travelling up an inclined road surface.

FIG. 2 is a schematic illustration of a vehicle 10 travelling up an inclined road surface 50 having an angle of incline $\theta_I$. The analysis and result are identical for a vehicle travelling down the same inclined road surface 50. The total angle of incline $\theta_T$ of the vehicle 10 is equal to the incline angle $\theta_I$ of the road surface 50 plus the pitch angle $\theta_P$ of the vehicle 10. The pitch angle $\theta_P$ of the vehicle 10 is the degree of longitudinal tilt of the vehicle 10 with respect to the road surface 50. It is computed as follows:

$$\theta_P = \text{PITCH STIFFNESS} \times \text{SENSED LONGITUDINAL ACCELERATION} \quad (1)$$

PITCH STIFFNESS is a constant term particular to a specific vehicle design. It is a function of such design parameters as vehicle size, weight distribution, wheel base and suspension. It represents the degrees of longitudinal tilt a vehicle 10 will experience for every unit of longitudinal acceleration equal to 9.8 m/s² (or g). Note that g is an abbreviated form for earth's gravitational force at one atmosphere and is often used as a unit for acceleration.

SENSED LONGITUDINAL ACCELERATION represents the longitudinal acceleration, in units of g, as sensed by the longitudinal accelerometer 34. The output of an accelerometer is a voltage signal having a magnitude varying in accordance with varying acceleration. The controller 26 of FIG. 1 compares the voltage level of the longitudinal accelerometer 34 with a predetermined voltage level corresponding to an acceleration equal to g. In this way, the controller 26 arrives at an acceleration in units of g corresponding to the actual accelerometer voltage output. For example, an accelerometer output voltage level of 2 volts may correspond to an acceleration of 1 g. So an accelerometer with an output of 1 volt corresponds to an acceleration of 0.5 g, or 4.9 m/s².

By multiplying PITCH STIFFNESS (degree/g) by the SENSED LONGITUDINAL ACCELERATION (g), a pitch angle $\theta_P$ in degrees is obtained.

Factors contributing to the sensed longitudinal acceleration are as follows:

SENSED LONGITUDINAL ACCELERATION = (2)

(YAW RATE × LATERAL VELOCITY) +

COMPUTED LONGITUDINAL ACCELERATION +

$G[SIN(\theta_1 + \theta_P)]$ + BIAS$_{LONG}$

YAW RATE = (3)

$$\frac{\text{LEFT REAR WHEEL SPEED} - \text{RIGHT REAR WHEEL SPEED}}{\text{DISTANCE BETWEEN THE REAR WHEELS}}$$

For a forward travelling vehicle, a positive yaw rate represents a clockwise vehicle naming maneuver, while a negative yaw rate represents a counterclockwise vehicle naming maneuver.

LATERAL VELOCITY is the speed by which the vehicle is travelling laterally. It exists during transient conditions such as varying yaw rates or angular accelerations. However, incline angle computation is not performed during varying yaw rates to insure computational accuracy. Therefore, LATERAL VELOCITY is essentially zero and the first term of equation (2) is negligible.

Each of the two rear wheels 16 and 18 have rotational speed sensors 22 and 24, respectively. The output of the two sensors are utilized by the controller 26 to compute the average speed of the two rear wheels, thereby achieving a longitudinal velocity. Longitudinal velocity is recalculated each scan of the controller 26. The change in longitudinal velocity from one scan to the next is divided by the scan rate of the controller to arrive at the COMPUTED LONGITUDINAL ACCELERATION term of equation (2).

BIAS$_{LONG}$ is a known constant voltage offset corresponding to the amount of offset of the longitudinal accelerometer 34 from a perpendicular to the vehicle plane 52. An accelerometer which is offset will result in a constant voltage bias which must be accounted for in computing acceleration.

Recall that the surface incline angle $\theta_I$ is the desired result. Eliminating the first term from equation (2) and solving for $\theta_I$ provides the following equation used by controller 26 to compute $\theta_I$:

$\theta_1$ = SIN$^{-1}$[SENSED LONGITUDINAL ACCELERATION − COMPUTED LONGITUDINAL ACCELERATION − BIAS$_{LONG}$] − $\theta_P$ (4)

Since all quantities in equation (4) are known, the incline angle $\theta_I$ of the road surface 50 can be computed.

Figure 3:
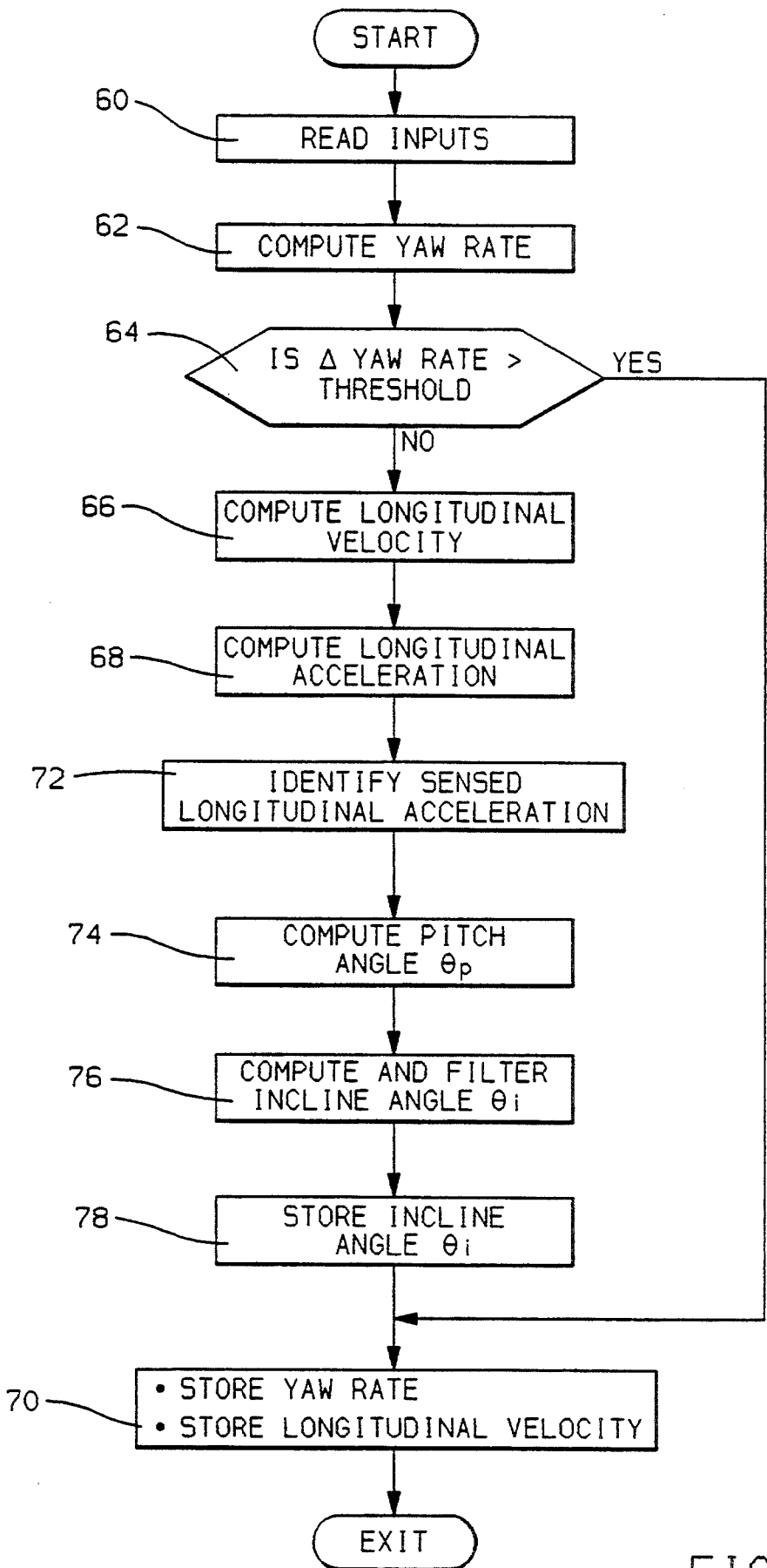
FIG. 3 is a flow diagram for an incline angle calculation routine implemented by a controller.

FIG. 3 is a flow diagram for an incline angle calculation routine contained within and performed by controller 26 for implementation of the present invention. The routine is performed each scan of the controller. Referring to FIG. 3, step 60, input signals from the two rear wheel speed sensors 22 and 24 and the longitudinal accelerometer 34 are read via signal lines 28, 30 and 40, respectively.

At step 62, the vehicle yaw rate is computed in accordance with equation (3) based upon the newly read inputs of step 60. The newly computed yaw rate of step 62 is compared in step 64 with the previously calculated yaw rate of step 62 stored in memory during the last scan of the controller 26. If the difference between the two yaw rates is greater than a predetermined threshold, the controller 26 exits the routine. This ensures that the incline angle computation is not performed during angular accelerations which could affect the accuracy of the computation. Prior to exiting, the newly computed yaw rate of step 62 is stored into memory at step 70 for reference during the next scan of the controller 26.

At step 66, the controller 26 computes a longitudinal velocity in accordance with the average rear wheel speeds. In step 68, a vehicle longitudinal acceleration is computed as a change in the longitudinal velocity of step 66 from the previously computed longitudinal velocity of step 66 stored in memory during the last scan of the controller 26, divided by the scan rate of the controller 26.

At step 72, the controller 26 identifies the vehicle longitudinal acceleration sensed by the longitudinal accelerometer 34 corresponding to the input read in step 60. At step 74, the vehicle pitch stiffness is multiplied by the sensed longitudinal acceleration of step 72 to arrive at a vehicle pitch angle $\theta_P$. At step 76, the incline angle $\theta_I$ of the road surface 50 is computed in accordance with equation (4), and filtered by methods well known to those skilled in the art to eliminate noise.

The incline angle $\theta_I$ is then stored in memory at step 78 for use by various vehicle control systems to improve handling and operation. Prior to exiting, the computed yaw rate of step 62 and longitudinal velocity of step 66 are stored in memory in step 70 for reference during the next scan of the controller 26.

Figure 4:
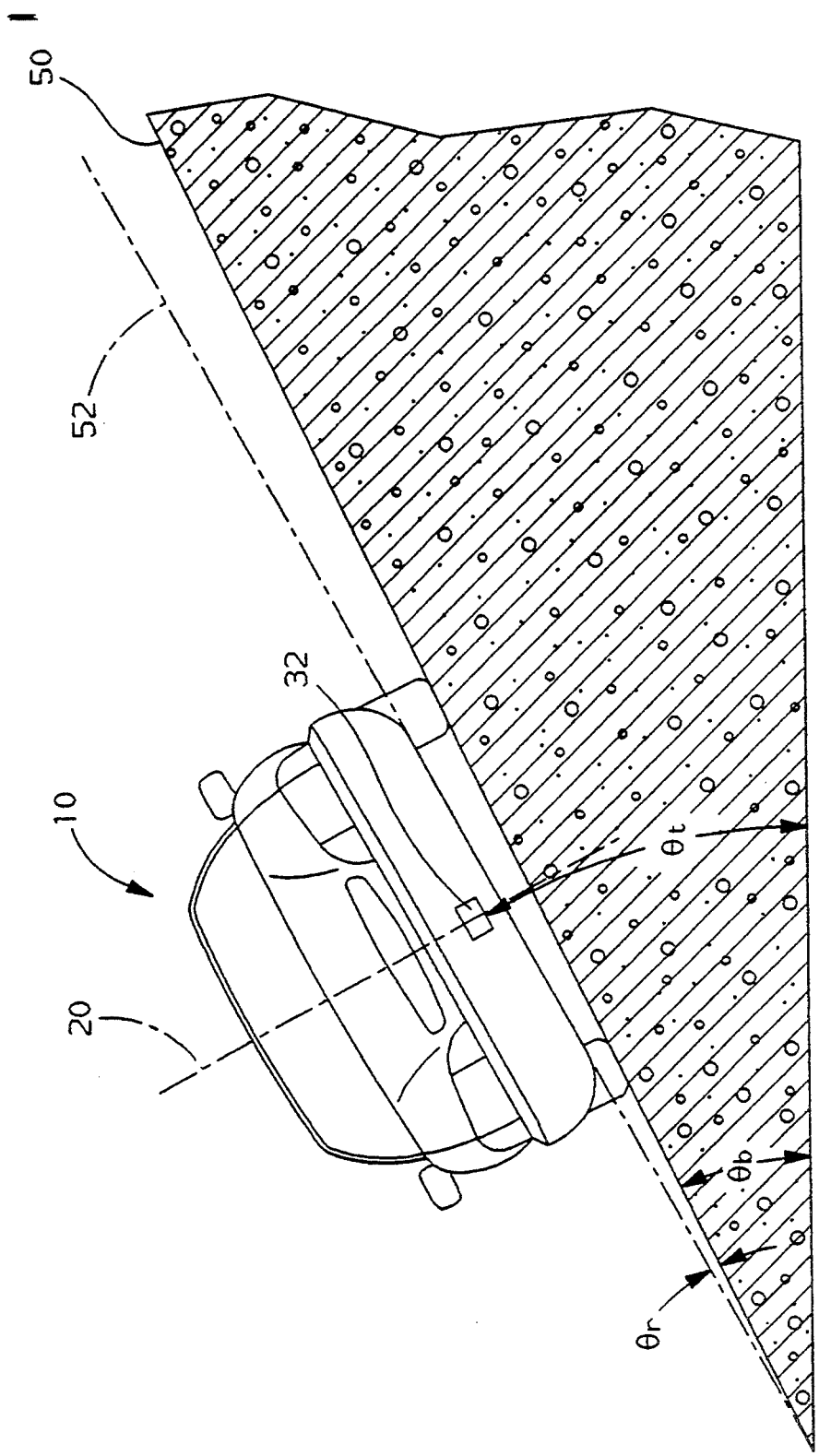
FIG. 4 is a schematic illustration of a vehicle travelling along a banked road surface.

FIG. 4 is a schematic illustration of a vehicle 10 travelling along a banked road surface 50 having an angle of bank $\theta_B$. The total angle of bank $\theta_T$ of the vehicle 10 is equal to the bank angle $\theta_B$ of the road surface 50 plus the roll angle $\theta_R$ of the vehicle 10. The roll angle $\theta_R$ of the vehicle 10 is the degree of lateral tilt of the vehicle 10 with respect to the road surface 50. It is computed as follows:

$\theta_R$ = ROLL STIFFNESS × SENSED LATERAL ACCELERATION (5)

ROLL STIFFNESS is a constant term particular to a specific vehicle design. It is a function of such design parameters as vehicle size, weight distribution, wheel base and suspension. It represents the degrees of lateral tilt a vehicle 10 will experience for every unit of lateral acceleration equal to 9.8 m/s² (or g). Recall that g is an abbreviated form for earth's gravitational force at one atmosphere and is often used as a unit for acceleration.

SENSED LATERAL ACCELERATION represents the lateral acceleration, in units of g, as sensed by the lateral accelerometer 32. By multiplying roll STIFFNESS (degree/g) by the SENSED LATERAL ACCELERATION (g), a roll angle $\theta_R$ in degrees is obtained.

Factors contributing to the sensed lateral acceleration are as follows:

SENSED LATERAL ACCELERATION = (6)

(YAW RATE ×

COMPUTED LONGITUDINAL VELOCITY) +

$D$(LATERAL VELOCITY)/$DT$ + $G$[SIN($\theta_s + \theta_p$)] + BIAS$_{LAT}$

YAW RATE is the rate of vehicle turning in degrees per second. It is computed as follows:

YAW RATE = (7)

$$\frac{\text{LEFT REAR WHEEL SPEED} - \text{RIGHT REAR WHEEL SPEED}}{\text{DISTANCE BETWEEN THE REAR WHEELS}}$$

Each of the two rear wheels 16 and 18 have rotational speed sensors 22 and 24, respectively. The output of the two sensors are utilized by the controller 26 to compute the average speed of the two rear wheels, thereby achieving a longitudinal velocity. Longitudinal velocity is recalculated each scan of the controller 26.

LATERAL VELOCITY is the speed by which the vehicle is travelling laterally. It exists during transient conditions such as varying yaw rates or angular accelerations. However, bank angle computation is not performed during varying yaw rates to insure computational accuracy. Therefore, D(LATERAL VELOCITY)DT is essentially zero and the second term of equation (6) is negligible.

BIAS$_{LAT}$ is a known constant voltage offset corresponding to the degree of offset of the lateral accelerometer 32 from a perpendicular to the vehicle plane 52. An accelerometer which is offset will result in a constant voltage bias which must be accounted for in computing acceleration.

Recall that the surface bank angle $\theta_B$ is the desired result. Eliminating the second term from equation (6) and solving for $\theta_B$ provides the following equation used by controller 26 to compute $\theta_B$:

$\theta_B$ = SIN$^{-1}$[SENSED LATERAL ACCELERATION − (YAW RATE × COMPUTED LONGITUDINAL VELOCITY) − BIAS$_{LAT}$]$\theta_R$ (8)

Since all quantities in equation (8) are known, the bank angle $\theta_B$ of the road surface 50 can be computed.

Figure 5:
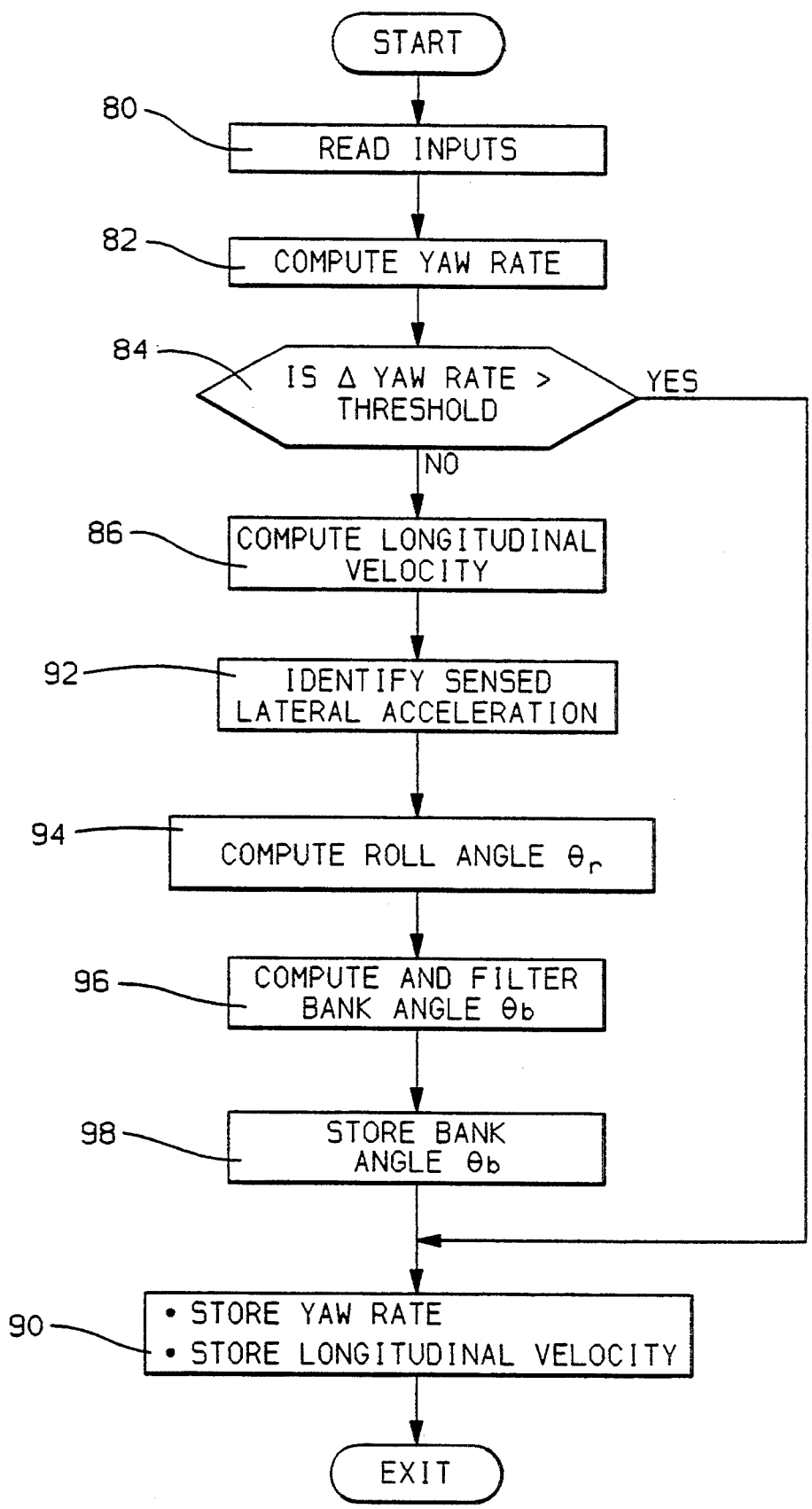
FIG. 5 is a flow diagram for a bank angle calculation routine implemented by a controller.

FIG. 5 is a flow diagram for a bank angle calculation routine contained within and performed by controller 26 for implementation of the present invention. The routine is performed each scan of the controller. Referring to FIG. 5, step 80, input signals from the two rear wheel speed sensors 22 and 24 and the lateral accelerometer 32 are read via signal lines 28, 30 and 38, respectively.

At step 82, the vehicle yaw rate is computed in accordance with equation (7) based upon the newly read inputs of step 80. The newly computed yaw rate of step 82 is compared in step 84 with the previously calculated yaw rate of step 82 stored in memory during the last scan of the controller 26. If the difference between the two yaw rates is greater than a predetermined threshold, the controller 26 exits the routine. This ensures that the bank angle computation is not performed during angular accelerations which could affect the accuracy of the computation. Prior to exiting, the newly computed yaw rate of step 82 is stored into memory at step 88 for reference during the next scan of the controller 26.

At step 86, the controller 26 computes a vehicle longitudinal velocity in accordance with the average wheel speeds. At step 92, the controller 26 identifies the vehicle lateral acceleration sensed by the lateral accelerometer 32 corresponding to the input read in step 80. At step 94, the vehicle roll stiffness is multiplied by the sensed lateral acceleration of step 92 to arrive at a vehicle roll angle $\theta_R$. At step 96, the bank angle $\theta_B$ of the road surface 50 is computed in accordance with equation (8), and filtered to eliminate noise.

The bank angle $\theta_B$ is then stored in memory at step 98 for use by various vehicle control systems to improve handling and operation. Prior to exiting, the computed yaw rate of step 82 and longitudinal velocity of step 86 are stored in memory in step 90 for reference during the next scan of the controller 26.

The embodiments of this invention in which an exclusive property or privilege is claimed are defined as follows:

1. An apparatus for estimating an incline angle of a road surface upon which a front wheel drive vehicle is travelling, the apparatus comprising:
   a first sensor for providing a first output signal responsive to a rotational speed of a first rear wheel;
   a second sensor for providing a second output signal responsive to a rotational speed of a second rear wheel;
   a third sensor for providing a third output signal responsive to a sensed longitudinal acceleration of the vehicle; and
   a controller for processing the first, second and third output signals to arrive at an estimated incline angle, the controller comprising:
   means for computing a longitudinal acceleration as a function of the rotational speeds of the first and second rear wheels in accordance with the first and second output signals;
   means for determining a pitch angle of the vehicle as a function of the sensed longitudinal acceleration in accordance with the third output signal; and
   means for estimating the road surface incline angle as a function of the computed longitudinal acceleration, sensed longitudinal acceleration in accordance with the third output signal and pitch angle.

2. The apparatus for estimating an incline angle of a road surface according to claim 1, the controller further comprising a means for storing the estimated road surface incline angle in a memory location for use by vehicle control systems to alter vehicle attributes for improved operation and handling.

3. The apparatus for estimating an incline angle of a road surface according to claim 1, further comprising:
means for determining a yaw rate of the vehicle as a function of a difference between the sensed rotational speeds of the first and second rear wheels in accordance with the first and second output signals, and a distance between the first and second rear wheels;
means for computing a change in yaw rate over a predetermined time period; and
means for inhibiting incline angle estimation if the change in yaw rate is greater than a predetermined threshold.

4. The apparatus for estimating ant incline angle of a road surface according to claim 1, wherein the means for computing a longitudinal acceleration comprises:
means for determining an average rotational speed of the first and second rear wheels in accordance with the first and second output signals; and
means for determining a change in the average rotational speed over a predetermined time period.

5. The apparatus for estimating an incline angle of a road surface according to claim 1, wherein the incline angle is estimated in accordance with the following function:

$$\theta_I = \text{SIN}^{-1}[\text{SENSED LONGITUDINAL ACCELERATION} - \text{COMPUTED LONGITUDINAL ACCELERATION} - \text{BIAS}_{LONG}] - \theta_P$$

where,
$\theta_I$ = incline angle,
$\theta_P$ = pitch angle, and
$\text{BIAS}_{LONG}$ = a constant.

6. A method for estimating an incline angle of a road surface upon which a front wheel drive vehicle is travelling, the method comprising:
providing a first output signal responsive to a rotational speed of a first rear wheel;
providing a second output signal responsive to a rotational speed of a second rear wheel;
providing a third output signal responsive to a sensed longitudinal acceleration of file vehicle;
computing a longitudinal acceleration as a function of the rotational speeds of the first and second rear wheels in accordance with the first and second output signals;
determining a pitch angle of the vehicle as a function of the sensed longitudinal acceleration in accordance with the third output signal;
estimating the road surface incline angle as a function of the computed longitudinal acceleration, sensed longitudinal acceleration in accordance with the third output signal and pitch angle,
wherein the estimated road surface incline angle is used by a vehicle control systems to alter vehicle attributes for improved operation and handling.

7. The method for estimating an incline angle of a road surface according to claim 6, further comprising:
determining a yaw rate of the vehicle as a function of a difference between the sensed rotational speeds of the first and second rear wheels in accordance with the first and second output signals, and a distance between the first and second rear wheels;
computing a change in yaw rate over a predetermined time period; and
inhibiting incline angle estimation if the change in yaw rate is greater than a predetermined threshold.

8. The method for estimating an incline angle of a road surface according to claim 6, wherein computing a longitudinal acceleration comprises:
determining an average rotational speed of the first and second rear wheels in accordance with the first and second output signals; and
determining a change in the average rotational speed over a predetermined time period.

9. The method for estimating an incline angle of a road surface according to claim 6, wherein the incline angle is estimated in accordance with the following function:

$$\theta_I = \text{SIN}^{-1}[\text{SENSED LONGITUDINAL ACCELERATION} - \text{COMPUTED LONGITUDINAL ACCELERATION} - \text{BIAS}_{LONG}] - \theta_P$$

where,
$\theta_I$ = incline angle,
$\theta_P$ = pitch angle, and
$\text{BIAS}_{LONG}$ = a constant.

10. An apparatus for estimating a bank angle of a road surface upon which a front wheel drive vehicle is travelling, the apparatus comprising:
a first sensor for providing a first output signal responsive to a rotational speed of a first rear wheel;
a second sensor for providing a second output signal responsive to a rotational speed of a second rear wheel;
a third sensor for providing a third output signal responsive to a sensed lateral acceleration of the vehicle; and
a controller for processing the first, second and third output signals to arrive at an estimated bank angle, the controller comprising:
means for computing a longitudinal velocity as an average of the sensed rotational speeds of the first and second rear wheels in accordance with the first and second output signals;
means for determining a roll angle of the vehicle as a function of the sensed lateral acceleration in accordance with the third output signal;
means for determining a yaw rate of the vehicle as a function of a difference between the sensed rotational speeds of the first and second rear wheels in accordance with the first and second output signals, and a distance between the first and second rear wheels; and
means for estimating the road surface bank angle as a function of the computed longitudinal velocity, sensed lateral acceleration in accordance with the third output signal, roll angle and yaw rate.

11. The, apparatus for estimating a bank angle of a road surface according to claim 10, the controller further comprising a means for storing the estimated road surface bank angle in a memory location for use by vehicle control systems to alter vehicle attributes for improved operation and handling.

12. The apparatus for estimating a bank angle of a road surface according to claim 10, further comprising:

means for computing a change in yaw rate over a predetermined time period; and means for inhibiting bank angle estimation if the change in yaw rate is greater than a predetermined threshold.

13. The apparatus for estimating a bank angle of a road surface according to claim 10, wherein the bank angle is estimated in accordance with the following function:

$$\theta_B = \text{SIN}^{-1}[\text{SENSED LATERAL ACCELERATION} - (\text{YAW RATE} \times \text{COMPUTED LONGITUDINAL VELOCITY}) - \text{BIAS}_{LAT}] - \theta_R$$

where, $\theta_B$ = bank angle,
$\theta_R$ = roll angle, and
$\text{BIAS}_{LAT}$ = a constant 14. A method for estimating a bank angle of a road surface upon which a front wheel drive vehicle is travelling, the method comprising:

providing a first output responsive to a rotational speed of a first rear wheel;

providing a second output responsive to a rotational speed of a second rear wheel;

providing a third output responsive to a sensed lateral acceleration of the vehicle;

computing a longitudinal velocity as an average of the sensed rotational speeds of the first and second rear wheels in accordance with the first and second output signals;

determining a roll angle of the vehicle as a function of the sensed lateral acceleration in accordance with the third output signal;

determining a yaw rate of the vehicle as a function of a difference between the sensed rotational speeds of the first and second rear wheels in accordance with the first and second output signals, and a distance between the first and second rear wheels;

estimating the road surface bank angle as a function of the computed longitudinal velocity, sensed lateral acceleration in accordance with the third output signal, roll angle and yaw rate, wherein the estimated road surface bank angle is used by a vehicle control systems to alter vehicle attributes for improved handling and operation.

15. The method for estimating a bank angle of a road surface according to claim 14, further comprising:

computing a change in yaw rate over a predetermined time period; and inhibiting bank angle estimation if the change in yaw rate is greater than a predetermined threshold.

16. The method for estimating a bank angle of a road surface according to claim 14, wherein the bank angle is estimated in accordance with the following function:

$$\theta_B = \text{SIN}^{-1}[\text{SENSED LATERAL ACCELERATION} - (\text{YAW RATE} \times \text{COMPUTED LONGITUDINAL VELOCITY}) - \text{BIAS}_{LAT}] - \theta_R$$

where, $\theta_B$ = bank angle,
$\theta_R$ = roll angle, and
$\text{BIAS}_{LAT}$ = a constant.

* * * * *